United States Patent

Hedman

[11] 3,979,190
[45] Sept. 7, 1976

[54] SERIES FEED MEMBRANE STACK

[75] Inventor: Jonathan W. Hedman, Burnt Hills, N.Y.

[73] Assignee: General Electric Company, Milwaukee, Wis.

[22] Filed: June 4, 1974

[21] Appl. No.: 476,419

[52] U.S. Cl. .................................. 55/158; 55/16
[51] Int. Cl.² ...................................... B01D 59/14
[58] Field of Search ................. 55/158, 16, 163, 21

[56] References Cited
UNITED STATES PATENTS

| 3,307,330 | 3/1967 | Niedzielski et al. | 55/16 |
| 3,350,844 | 11/1967 | Robb | 55/16 |
| 3,630,001 | 12/1971 | Hamerski | 55/158 |
| 3,837,146 | 9/1974 | Faure et al. | 55/158 |

Primary Examiner—John Adee
Assistant Examiner—Ethel R. Cross
Attorney, Agent, or Firm—Thomas J. Bird, Jr.; Granville M. Pine; Edward A. Hedman

[57] ABSTRACT

A plurality of selectively permeable membrane cells are mounted in parallel spaced-apart relationship to form a stack. Each cell includes a substrate and selectively permeable membranes positioned on the major surfaces thereof. The substrates are provided with flow ports at alternate end portions to provide a series flow path through the stack which is sealed by peripheral gasket members and end plates. The stack is adapted for use in pressure and vacuum gas enricher systems.

9 Claims, 4 Drawing Figures

SERIES FEED MEMBRANE STACK

BACKGROUND OF THE INVENTION

In the treatment of patients suffering respiratory ailments, such as emphysema where the patient's lung capacity is severely restricted, it is common practice to provide the patient with a source of oxygen. Typically, this source of oxygen is provided from a pressurized oxygen cylinder which may be located remotely from the patient in a hospital and supplied through suitable tubing (central storage type) or may be an individual cylinder located at the patient's bedside. Since many of these ailments are chronic and require extended therapy, portable oxygen cylinders which the patient may use at home have been developed.

While the use of individual cylinders provides the necessary life-sustaining therapy for these patients, the cylinders themselves present several problems when used in the home. Specifically, since the cylinders contain high pressure (2000 p.s.i.) oxygen, they present a constant danger of fire and explosion during use. The individual cylinders have limited capacity, and therefore must be serviced and replaced routinely thereby increasing the cost of therapy. In addition, there may also be leakage problems which may unexpectedly diminish the capacity of a cylinder so that the patient is left with inadequate therapy gas.

Atmospheric air, which contains about 21% oxygen and 78% nitrogen, provides a vast and abundant source of oxygen. However, until recently technology for extracting oxygen economically for individual use has been lacking. Now, however, membranes have been developed which are adapted to feasible separation of gases.

As is well known to those skilled in the art, separation of gases in membrane technology is based on the selective permeability of certain materials. The term "selective permeability" means that one gas in a mixture will permeate through a membrane faster than a second gas, but this is not to suggest that one gas passes through the membrane to the complete exclusion of all others. Rather, a difference in a flow rate of two molecular species through a permeable membrane results so that the gas mixture on one side of the membrane is depleted in concentration of the more permeable component and the gas on the opposite side of the membrane is enriched with the more permeable component.

SUMMARY OF THE INVENTION

The present invention relates to gas separation by means of permeable films or membranes and more specifically to a portable, atmospheric air, oxygen enricher which is adapted for use in the hospital or in the patient's home.

The portable oxygen enricher includes an array of selectively permeable membrane cells which have a high permeability of oxygen relative to nitrogen. The membranes may be of several types including silicone rubber and polyphenylene ethers, the latter being preferred. The membrane cells are mounted in parallel spaced-apart relationship within a pressure vessel. A compressor delivers a flow of compressed atmospheric air to the pressure vessel and the interiors of the cells are manifolded to provide a pressure differential across the cell membranes and to draw off oxygen enriched gas which permeates through the membranes. The compressed atmospheric air is cooled by a heat exchanger to a controlled temperature and scrubbed to remove nitrogen dioxide prior to introduction into the pressure vessel.

The cell array is constructed to provide series flow of the atmospheric air therethrough so that a portion of the flow permeates through the cell to provide oxygen enriched gas. Typically, about 25% of the flow across the cells permeates through the cells to provide a gas enriched in oxygen to about 40%. The oxygen depleted gas, or raffinate, flows past the cell array and out of the pressure vessel to be exhausted to atmosphere.

Preferably the output from the cell array or stack is divided into two subflows, so that the pressure differential between the two subflows may be monitored. The pressure differential or ratio between the subflows functions to provide a means for detecting leaks. After the enriched gas passes from the stack through a membrane monitor, the two subflows are united, pass through a bacterial filter and exit through a hose barb to which is attached a face mask or other device of inhalation by the patient.

The oxygen enricher of the present invention provides a unit which produces enriched oxygen gas as needed by the patient without the inherent danger of stored oxygen gas cylinders. The enricher provides a source of enriched gas limited only by the availability of electric power and the component life of the apparatus which is well in excess of the storage capacity of individual cylinders thereby increasing the reliability and safety of the device as well as providing an economical source of oxygen for patient requiring prolonged respiratory therapy.

AIR SUPPLY SYSTEM

Figure 1:
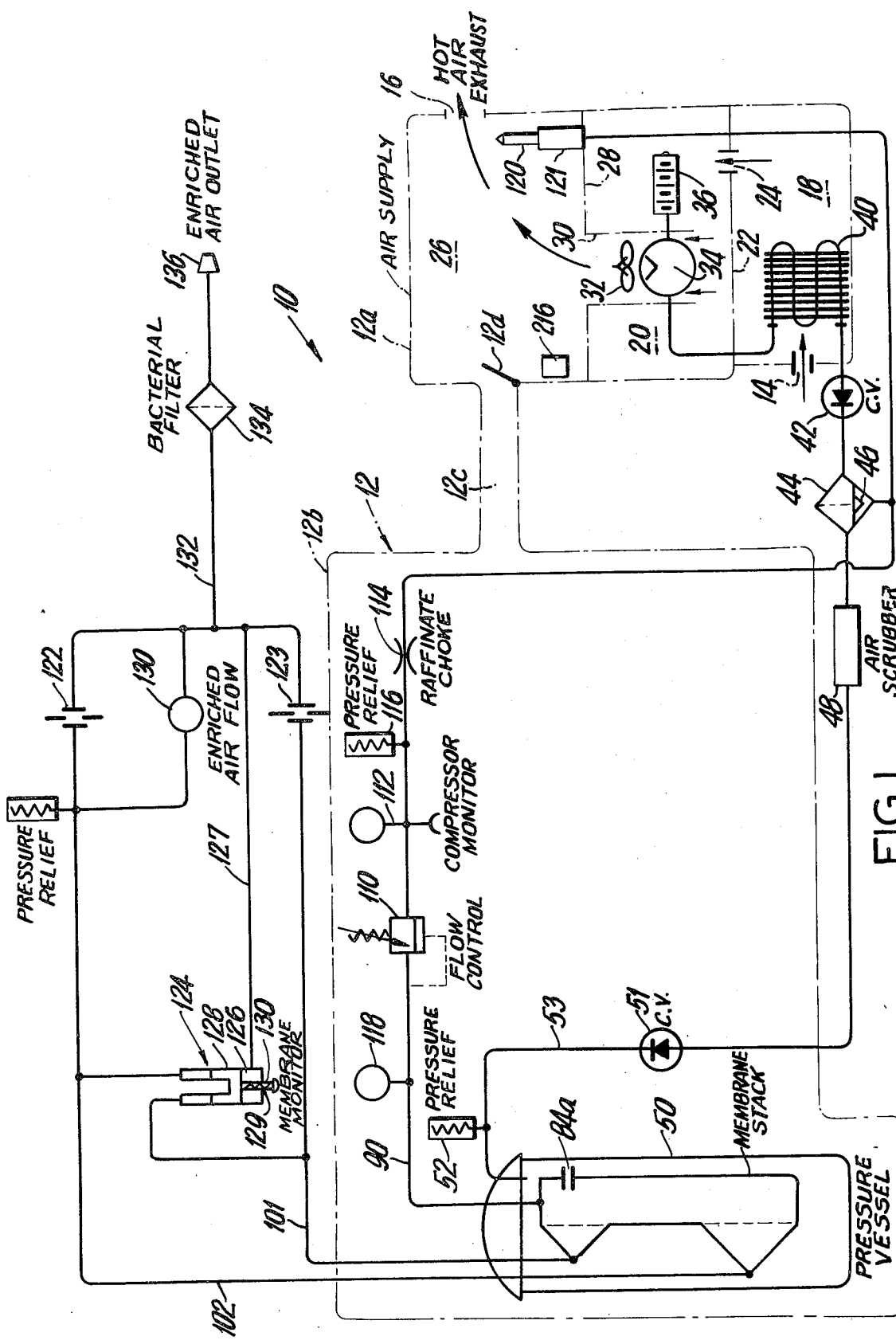
FIG. 1 is a pneumatic diagram illustrating an exemplary form of a membrane oxygen enricher in accordance with the present invention.

FIG. 1 illustrates an oxygen enricher 10 in which atmospheric air is compressed and passed over an array of selectively permeable membranes which permit oxygen to permeate therethrough at a greater rate than nitrogen to provide a flow of oxygen enriched gas for inhalation by a patient. Enricher 10 includes a housing 12 which is formed by two box-like structures to form an air supply structure 12a and a pressure vessel structure 12b, which are in fluid communication with each other by means of a flow channel 12c. A one-way flapper valve 12d is positioned in channel 12c to permit air to flow from structure 12a and 12b to heat the pressure vessel, described below.

Air supply structure 12a defined an atmospheric air intake port 14 and a hot exhaust port 16. The interior of structure 12a is subdivided into three chambers or regions including a cool air region 18, an intake region 20 separated from region 18 by a divider member 22, which is apertured at 24 to provide a flow path therebetween, and an exhaust chamber 26. Chamber 26 is separated from chamber 20 by means of a dividing wall 28 which forms an air passage 30 between the chambers. Atmospheric air is drawn through the air supply structure 12a by means of a fan 32 positioned within the structure, preferably within air passage 30.

A compressor 34 for producing the flow of compressed air for the enricher is positioned within chamber 20 and draws a supply of air through intake muffler 36 from the atmospheric air circulating through the air supply structure. Muffler 36 and air supply enclosure 12a are designed to attenuate the noise level created by the compressor intake, preferably to less than 50 decibels, since the enricher is designed for use in the home and in close proximity to the patient. In addition to supplying the compressor with a source of air, it will be appreciated that the air circulating through the air supply structure provides a source of cooling air for the compressor. It will also be appreciated that a compressor having a fan mounted on its rotor may be used in place of separate fan 32 to circulate air through the structure.

Compressor 34 is designed to deliver a flow rate of from about 1.5 to about 1.7 standard cubic ft. per minute at 175 p.s.i.g. As will be discussed below, the membrane cells are designed to deliver about 8 liters per minute of enriched gas containing about 40% oxygen when operating at 95°F. To remove the heat of compression from the compressed air, the compressed air is directed into an air fin heat exchanger 40 positioned in cool air chamber 18 so that the air entering through port 14 passes directly over the heat exchanger before entering the chamber 20. Heat exchanger 40 thus lowers the temperature of the compressed air to within a few degrees of the ambient temperature, e.g. within 5°F of ambient and also condenses water vapors which are present in the compressed air. After being cooled, the compressed air passes through a check valve 42 to a water vapor separator 44 in which the condensate is removed from the compressed air and held in the trap of the separator until a float 46 is raised and the condensate is delivered for vaporization, as described below.

After condensate has been separated from the compressed air, the air passes through a scrubber 48 which removes nitrogen dioxide. Sulfur dioxide and other chemically active pollutants are removed by reaction with the surfaces of the pressure system or with the condensate before reaching the scrubber. The compressed air is then directed to a pressure vessel 50 through a check valve 51 and pressure relief valve 52 in line 53.

MEMBRANE STACK

Figure 3:
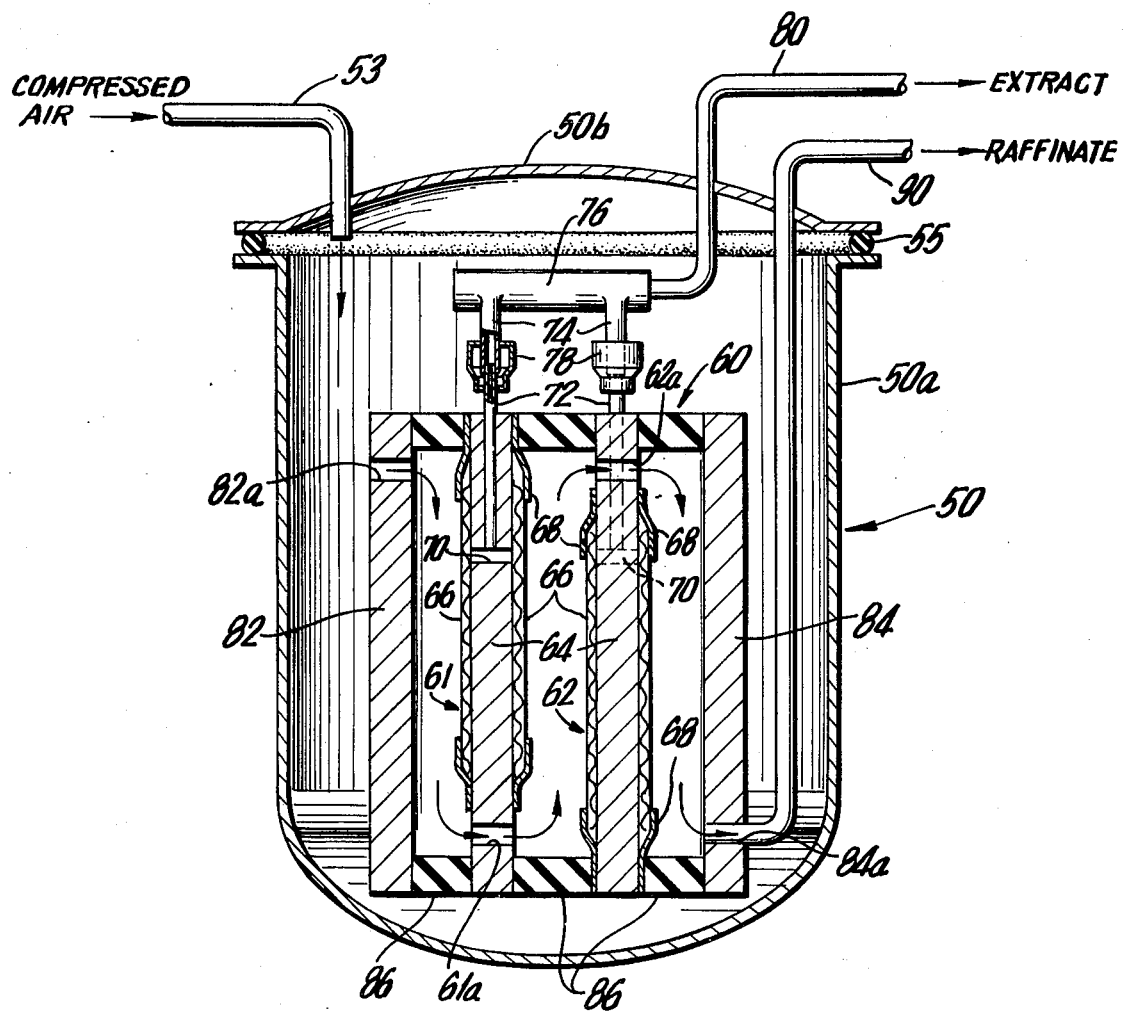
FIG. 3 is a schematic, cross-sectional view of a series flow membrane stack contained within a pressure vessel.

FIG. 3 shows a membrane stack 60 positioned in pressure vessel 50. Vessel 50 includes a generally U-shaped chamber portion 50a and a cover portion 50b which is in sealing engagement with portion 50a by means of a gasket 55 and suitable clamping means (not shown) as is known in the art. For clarity of illustration, stack 60 includes only two membrane cells 61 and 62. Each cell includes a rigid support substrate 64 which is generally rectangular in shape. Selectively permeable membranes 66, which may also include a porous backing material are positioned on the major surfaces of each substrate. Membranes 66 are also rectangular in shape but smaller in dimensions than substrate 64 to provide an exposed peripheral portion of the substrate when the membranes are attached thereto by tape 68 or other suitable means, which overlies the periphery of the membrane and the exposed portions of the substrate. Each substrate defines a central passageway 70 extending transversely between the major surfaces thereof so that enriched gas may be drawn off therethrough from the interface between the membranes and substrate. Extending upwardly from passage 70 is a tube 72 carried within a bore or slot in each substrate. Each tube 72 is connected to a nipple 74 extending from a common manifold 76 by a coupling 78. In this manner, oxygen enriched gas is collected in manifold 76 and directed to the control system, to be described below, through conduit 80, FIG. 3.

Membrane cells 61 and 62 are in sealing engagement with two end plates 82 and 84 by means of gaskets 86 of rubber or other resilient material which extend around the periphery of each cell. End plates 82 and 84 and cells 61 and 62 are maintained in sealing engagement with the gaskets through clamping means such as bolts (not shown). End plate 82 includes an air inlet port 82a adjacent the upper end of the stack through which compressed air enters the stack. Substrate 64 of cell 61 includes a flow port 61a at its lower end so that air entering port 82a from the pressure vessel flows downwardly along the left hand membrane 66 on cell 61 through port 61a and upwardly between cells 61 and 62. Substrate 64 of cell 62 also includes a flow port 62a located at the upper end thereof to provide a cross-over flow port for compressed air to flow downwardly along the right hand membrane of cell 62. End plate 84 includes an exhaust port 84a at the lower end thereof which delivers the oxygen depleted air or raffinate to an exhaust conduit 90 which passes through pressure vessel 50 for monitoring and exhaust, as will be described below.

Membrane 66 may be of several types, including silicone rubber and polyphenylene ether. The membranes themselves can be obtained by techniques known to those skilled in the art. Since the present invention is designed for use of a source of enriched oxygen for inhalation therapy, the oxygen enriched gas should contain 40% oxygen. For this level of enrichment membranes of polyphenylene ether are preferred. Preferably, each membrane cell has a permeation thickness in the order of about 1 micron (10,000 Angstroms) or less.

Figure 4:
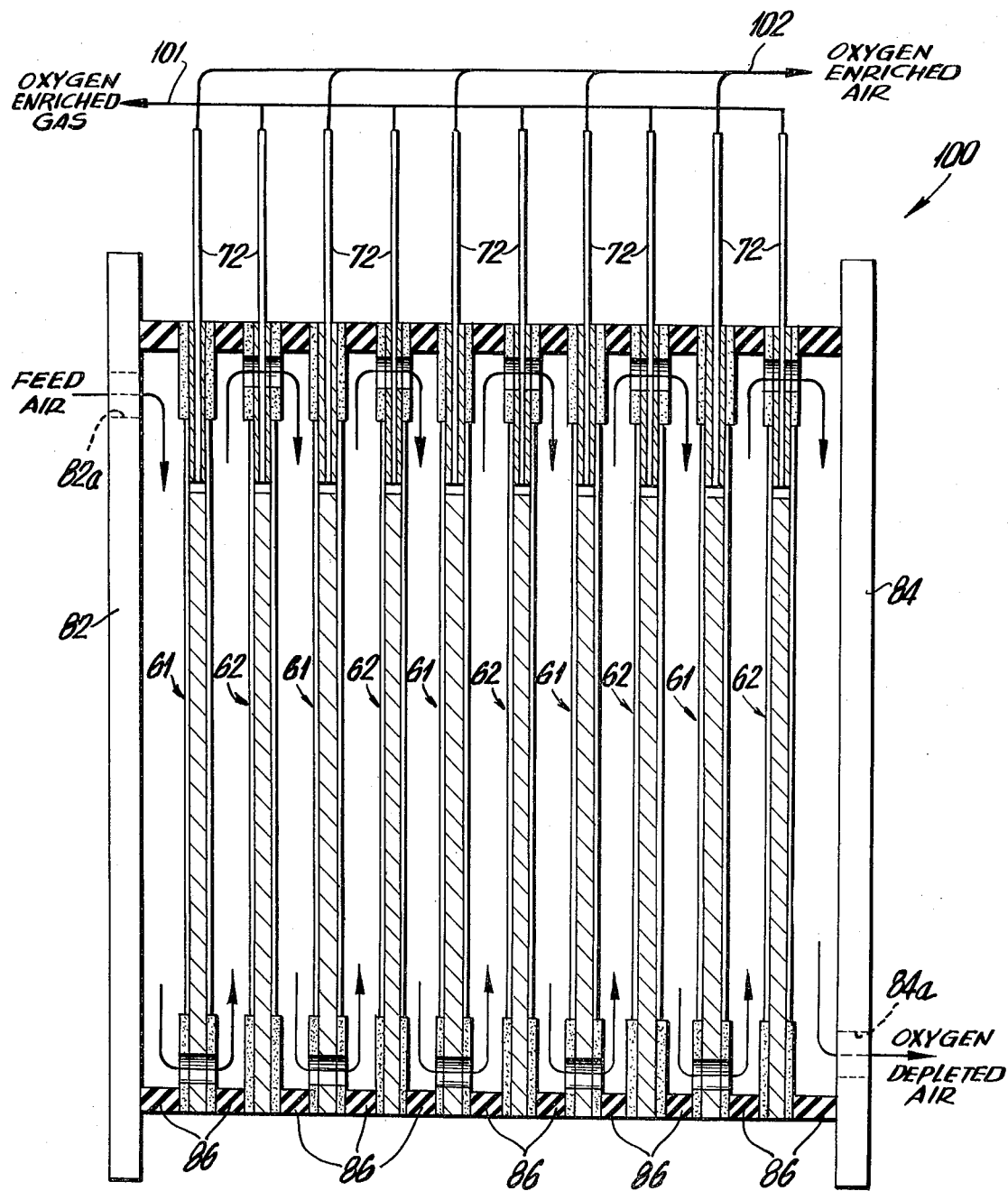
FIG. 4 is a schematic, cross-sectional view of a series flow membrane stack in which the stack extract is divided into two flows. DETAILED DESCRIPTION While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

Membrane stack 60 provides a series flow across the membrane cells 61 and 62. It will be appreciated that, although two cells are illustrated, a plurality of cells, such as illustrated in FIG. 4, may be utilized in which cells of a type corresponding to cell 61 are alternated with cells corresponding to cell 62 to provide multiple series flow membrane stack.

It has been found desirable to monitor the stack to determine whether leakage through the cells has occurred. To this end, the stack 100, FIG. 4 is preferred for use in the embodiment shown in FIG. 1. Stack 100 includes two groups of cells corresponding to cells 61 and 62. Stack 100 is similar in construction to stack 60 except that the extract tubes 72 from each group of cells are manifolded separately to provide two output flows which are drawn off through conduits 101 and 102 so that the performance of the stack may be monitored, as will be described below. Although the membrane cells 61 and 62 are illustrated as being flat and rectangular in shape, it will be appreciated that other shapes including cylindrical and circular cells also may be utilized. Moreover, the series flow membrane stack, either split flow or common flow, may be used in vacuum extract systems such as described in Blackmer et al., U.S. patent application Ser. No. 476,260, filed contemporaneously herewith.

RAFFINATE CONTROL SYSTEM

With reference to FIG. 1, the system pressure is controlled by an adjustable valve 110 located in the raffinate line 90. Valve 110 may be a needle valve, relief valve, or any other type of valve with an adjustable orifice. At a fixed temperature, the enriched air output from the membrane stack is directly proportional to the pressure differential across the membranes. By adjusting valve 110, the system pressure can be controlled, as monitored on gauge 118. In this manner the enriched gas flow may be varied.

It has been found that when 28 liters per minute of compressed air at 95°F and 175 p.s.i. are delivered to the membrane stack, the stack will produce oxygen enriched gas containing about 40% oxygen at the rate of 8 liters per minute. This enrichment results in the raffinate containing about 13% oxygen.

The raffinate flow is monitored by a pressure gauge and pneumatic switch 112 which are positioned upstream of a choke 114 in line 90. If the pressure in line 90 drops below the operating range of the stack, an electro-pneumatic switch 112, described in greater detail below, actuates an alarm system. Should the pressure in raffinate line 90 experience an excursion, a pressure relief valve 116 is provided to relieve the line.

The raffinate is carried by conduit 90 to an exhaust muffler 120 positioned within exhaust chamber 26 so that the oxygen depleted air is mixed with atmospheric air and discharged into the atmosphere through port 16. Condensate from separator 44 is directed into the raffinate line and carried along with the raffinate flow to a water evaporator 121 positioned within exhaust chamber 26, so that the water is evaporated to the atmosphere as the raffinate is discharged through muffler 120.

ENRICHED GAS SPLIT FLOW CONTROL

The split output of oxygen enriched gas carried by conduits 101 and 102 serves as a stack leak detector by monitoring the flow ratio of the two groups of membrane cells. Leak detection is accomplished by comparing the pressure drops across orifices 122 and 123. Orifice 122 is a fixed stack reference orifice and orifice 123 is an adjustable orifice which is initially matched to orifice 122 for given stack performance. In addition to monitoring the pressure drop ratio between orifices 122 and 123, the split stack output is also utilized to measure the flow rate of the oxygen enriched gas.

As illustrated, the membrane stack monitor comprises a two-legged manometer 124 having a variable capacity reservoir 126 (e.g. bellows) so that the manometer may function as a combination differential and total pressure gauge. The variable capacity reservoir 126 contains a fluid 128 which is exposed to the pressure in the legs of the manometer and moves therein to provide a visual indication of the pressure and flow. The level of fluid 128 is set at a null point by means of a set screw 129. The bellows 126 is biased by a spring 130 to permit the reservoir to expand in volume in response to the total pressure in the manometer legs which are in fluid communication with conduits 122 and 123, respectively.

If the pressures in conduits 101 and 102 are equal the liquid level will depress according to the following equation:

$$\Delta h = \frac{\pi D^4 P}{8 d^2 R}$$

where
D = reservoir diameter
d = tube diameter
P = pressure
R = spring constant
$\Delta h$ = liquid depression An imbalance in the pressures in conduits 101 and 102 will result in a difference in liquid level in the legs of the manometer, and the average depression is a measure of total pressure.

In addition to the use of a manometer, a flow gauge 130 is also provided for determining the flow rate in one leg of the split stack which is proportional to the total output flow. Conduits 101 and 102 are joined to a single flow line 132 and passed through a bacterial filter 134 to a hose barb 136 on which a hose and associated inhalation mask may be secured. In this manner, oxygen enriched gas is delivered to a patient. To minimize the effects of variations in back pressure introduced into the output line 132, such as might be caused by the patient coughing into the face mask, a line 127 provides communication between line 132 and the exterior expansible boundary of reservoir 126 to balance the manometer during such periods so that the average liquid height is relatively unaffected.

ELECTRICAL CONTROLS

Figure 2:
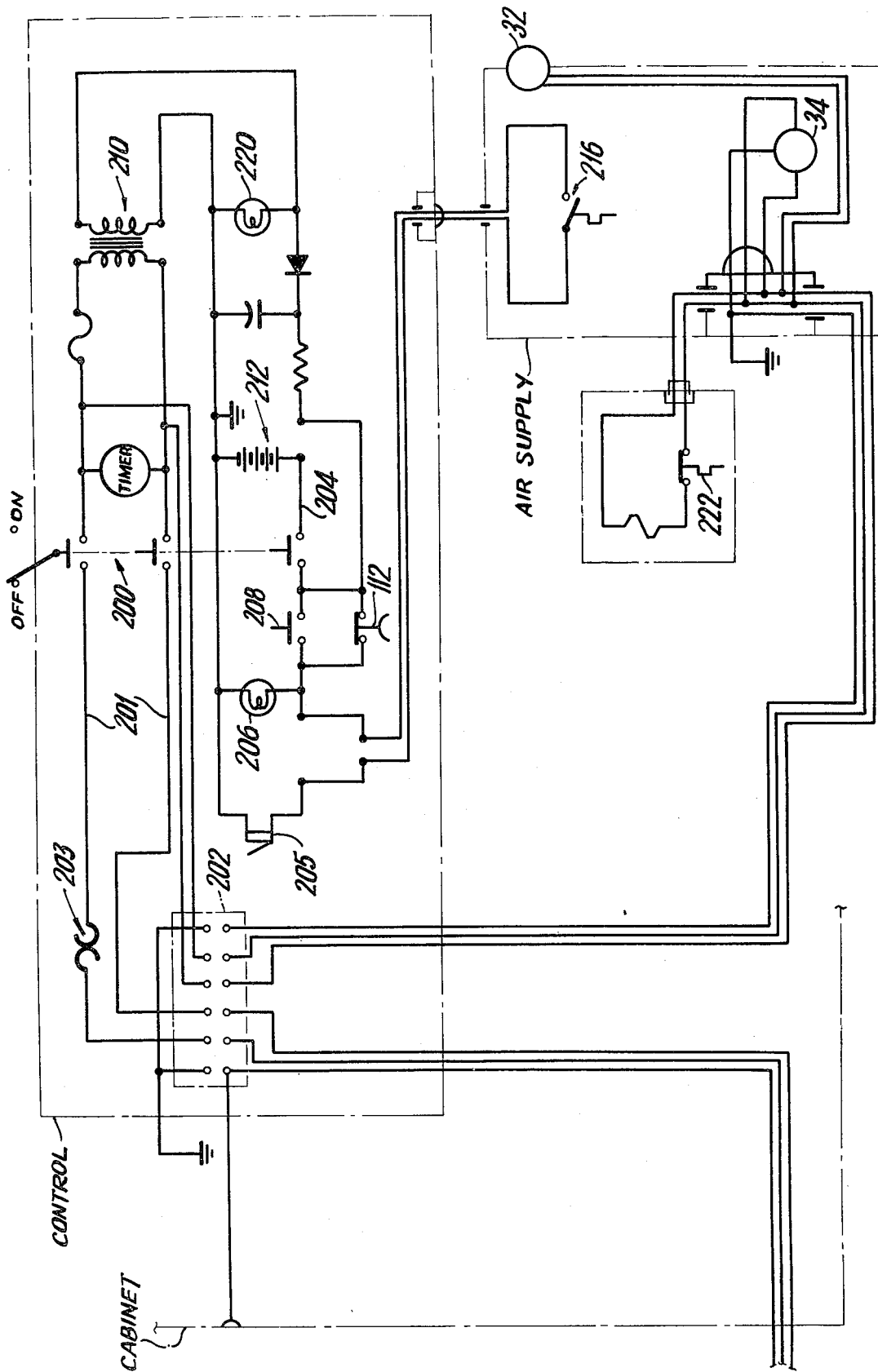
FIG. 2 is an electrical control system for use in the enricher shown in FIG. 1.

FIG. 2 illustrates the electrical circuit for enricher 10. Electrical power input to the enricher is controlled by switch 200 which breaks both sides of lines 201, which are connected to terminal box 202 through circuit breaker 203, and alarm line 204. The enricher 10 is provided with an audio and visual alarm system which includes audio alarm 205 and alarm light 206. Switch 208 in line 204 is utilized to test the alarm circuit after main switch 200 has been closed.

The audio and visual alarms are powered through a transformer-charger 210. When switch 200 is closed, transformer charges a battery 212 which provides auxiliary power to alarm line 204 in the event of a power failure. The alarm circuit may also be actuated by compressor monitor 112, discussed above, when the pressure in raffinate line 90 drops below the designed level. When the enricher is started, switch 112 is closed actuating alarm light 206. However, a switch 216, which is in series with the switch 112 is opened so that audio alarm 205 is not initially activated. Switch 216 is a thermal switch mounted in the air supply structure 12a. Under normal operating conditions, switch 112 opens before switch 216 closes so the audio alarm does not actuate, and the visual alarm 206 will be turned off as pressure in the raffinate line rises. If raffinate flow is low, switch 112 closes and both alarms 205 and 206 are turned on. In the event of power failure both alarms 205 and 206 will be turned on as soon as switch 112 closes, but as the unit cools, switch 216 opens and the audio alarm 205 is terminated while the visual alarm remains on. A light 220 is provided for illuminating the manometer 124.

Flapper valve 12d is controlled by a normally closed thermal switch and solenoid 222. If the temperature of the stack rises above the design point, valve 12d is closed to prevent further heating. When the stack cools to a temperature below the switch trap temperature, the valve is opened from chamber 12b exhausts into chamber 12a.

From the above description, it will be readily appreciated that a pressurized oxygen enricher is provided and modifications thereto in addition to those described may be made by those skilled in the art without departing from the spirit and scope of the invention as pointed out in the claims. The preferred embodiment is designed to be portable and may be equipped with casters so that they may be rolled from room-to-room in a patient's home. Although the enricher described includes a pressure vessel, the vessel and membrane stack are light weight in design so that the entire unit weighs less than 350 lbs. when fully assembled and may be powered by most household circuits without alterations.

What is claimed is:

1. An assembly for use in providing gas enriched in oxygen from atmospheric air comprising: first and second groups of selectively permeable membrane cells, said cells being adapted to permit oxygen to permeate therethrough at a greater rate than nitrogen: each of said cells including a rigid support substrate having selectively permeable membranes on opposite surfaces thereof, said membranes having smaller dimensions than said substrate, said substrate including passage means for the removal of enriched gas from the interface of said membranes and substrate; means for sealing the peripheral edges of the membranes to the associated periphery of the substrate, resilient means for mounting said cells in parallel spaced-apart relationship and sealing the outermost peripheral edges of the substrates in fluid tight relationship, said first group of cells being alternated with said second group of cells, the substrates of said first group of cells defining a flow channel therethrough at a given peripheral end and substrate of said second group defining a flow channel at the peripheral ends thereof opposite said given peripheral end, whereby said cells define a series flow path therethrough.

2. The assembly of claim 1, wherein each of said gas removal means is arranged to deliver said enriched gas to a common manifold.

3. The assembly of claim 1, wherein said resilient mounting and sealing means includes a plurality of gasket members corresponding in shape to the periphery of said cells, each of said cells being positioned between a pair of said gasket members, two end plates, each plate being positioned in abutting relationship with an outermost gasket member, one of said plates defining inlet ports for admission of gas to the cells and the other plate defining an extraction port to permit gas to flow through said assembly.

4. The assembly of claim 3, further including a pressure vessel for containing said cells and mounting means, said vessel adapted to receive compressed air from a source to provide a gas for enrichment by the cells.

5. The assembly of claim 3, wherein said cells are generally rectangular in shape.

6. The assembly of claim 1, wherein said cells are adapted to provide enriched gas containing about 40% oxygen.

7. The assembly of claim 6, wherein said membranes are formed of polyphenylene ether.

8. The assembly of claim 1 wherein each of said membranes includes a porous backing material positioned against said rigid substrate.

9. The assembly for use in providing gas enriched in oxygen from atmospheric air comprising:
a pressure vessel adapted to receive compressed atmospheric air from a source; an array of selectively permeable membrane cells within said vessel, said array including a plurality of rigid support substrates, each substrate having a polyphenylene ether membrane of smaller dimension sealingly positioned on opposite surfaces thereof, said membranes being adapted to permit oxygen to permeate therethrough at a greater rate than nitrogen, each substrate having passage means for the removal of oxygen enriched gas from the interface of the membranes and substrates; means for mounting said substrates in parallel, spaced apart relation including a plurality of gasket members positioned in sealing relationship with the peripheral portions of each of said substrates and end plates positioned in sealing relationship with the outermost gasket members, said end plates and said substrates each defining a flow port therethrough at alternate ends thereof to form a series flow path through said array; and means for extracting oxygen depleted air from the downstream end of said series flow path.

* * * * *